(12) United States Patent
Hull

(10) Patent No.: US 11,754,390 B2
(45) Date of Patent: Sep. 12, 2023

(54) METHOD, SYSTEM, AND APPARATUS FOR OPTICAL MEASUREMENT

(71) Applicant: THE BOEING COMPANY, Chicago, IL (US)

(72) Inventor: Jerald A. Hull, North Charleston, SC (US)

(73) Assignee: THE BOEING COMPANY, Chicago, IL (US)

( * ) Notice: Subject to any disclaimer, the term of this patent is extended or adjusted under 35 U.S.C. 154(b) by 61 days.

(21) Appl. No.: 17/648,355

(22) Filed: Jan. 19, 2022

(65) Prior Publication Data

US 2022/0228855 A1 Jul. 21, 2022

Related U.S. Application Data

(60) Provisional application No. 63/139,848, filed on Jan. 21, 2021.

(51) Int. Cl.
*G01B 11/24* (2006.01)
*G01B 9/02* (2022.01)
(Continued)

(52) U.S. Cl.
CPC ........ *G01B 11/2408* (2013.01); *G01B 9/0205* (2013.01); *G01B 11/12* (2013.01); *G01N 21/954* (2013.01)

(58) Field of Classification Search
CPC .......... G01B 21/954; G01B 2021/9542; G01B 2021/9544; G01B 2021/9548; G01B 11/2408; G01B 11/12; G01B 11/24; G01B 11/2425; G01B 21/14; G01B 21/20; E21B 47/08; E21B 47/082
See application file for complete search history.

(56) References Cited

U.S. PATENT DOCUMENTS 4,440,496 A 4/1984 Milana
4,967,092 A 10/1990 Fraignier et al.
(Continued)

FOREIGN PATENT DOCUMENTS

WO WO 2015/135045 A1 9/2015

OTHER PUBLICATIONS

EP Application No. 22152367, European Search Report dated Apr. 21, 2022.

*Primary Examiner* — Michael A Lyons
(74) *Attorney, Agent, or Firm* — Alston & Bird LLP

(57) ABSTRACT

A method, system and apparatus are provided in accordance with example embodiments for optically measuring workpiece features, and more particularly, to optically measure internal surfaces of round bores and countersinks. Methods include: advancing a probe through a bore and a countersink; and measuring dimensions of the bore and the countersink using a bore laser cone and a countersink laser cone, where the bore laser cone is received at the bore camera lens in response to reflecting from a first reflective surface of the probe to a surface of the bore to a third reflective surface of the probe and to the bore camera lens, and where the countersink laser cone is received at the countersink camera lens in response to the countersink laser cone reflecting from a second reflective surface of the probe to a surface of the countersink to a countersink beam reflector and to the countersink camera lens.

20 Claims, 16 Drawing Sheets

(51) Int. Cl.
  *G01B 11/12* (2006.01)
  *G01N 21/954* (2006.01)

(56) References Cited

U.S. PATENT DOCUMENTS

| | | | | |
|---|---|---|---|---|
| 5,317,387 | A | * | 5/1994 | Van Hengel ............ G01N 21/88 |
| | | | | 356/625 |
| 5,933,231 | A | | 8/1999 | Bieman et al. |
| 6,879,404 | B2 | | 4/2005 | Jagiella et al. |
| 7,243,553 | B2 | | 7/2007 | Jagiella et al. |
| 8,841,603 | B1 | | 9/2014 | Blanton et al. |
| 8,842,273 | B2 | | 9/2014 | Bergman et al. |
| 2011/0080588 | A1 | * | 4/2011 | Segall .................. G01N 21/954 |
| | | | | 356/445 |
| 2016/0187265 | A1 | * | 6/2016 | Rudolf ................. H04N 23/698 |
| | | | | 356/626 |
| 2017/0151643 | A1 | * | 6/2017 | Ficken ................ B23Q 17/2495 |
| 2018/0156738 | A1 | * | 6/2018 | Wagner ............... G01B 11/2518 |
| 2019/0271536 | A1 | * | 9/2019 | Haas ...................... G01B 21/14 |

* cited by examiner

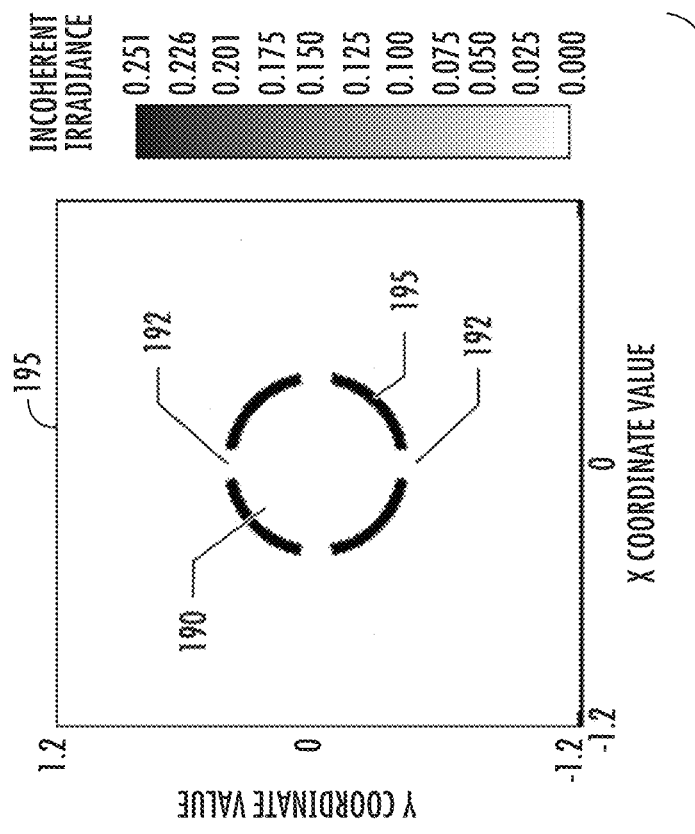
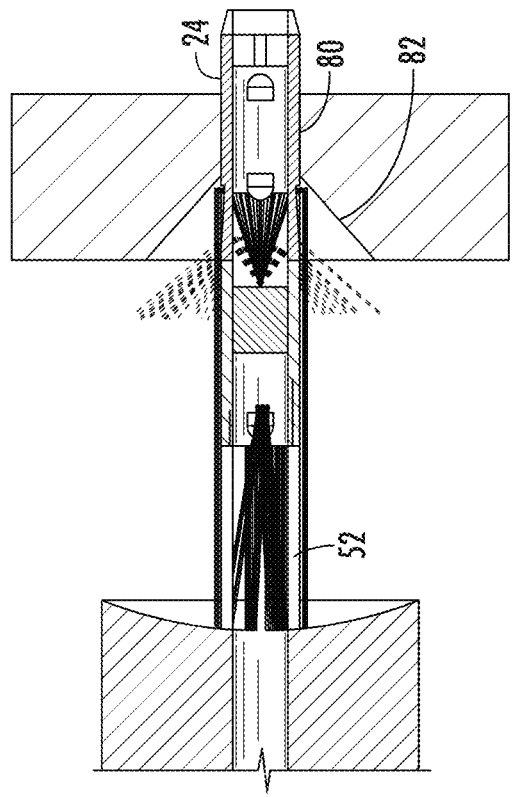
FIG. 8

METHOD, SYSTEM, AND APPARATUS FOR OPTICAL MEASUREMENT

CROSS-REFERENCE TO RELATED APPLICATIONS

This application claims priority to U.S. Provisional Patent Application Ser. No. 63/139,848, filed on Jan. 21, 2021, the contents of which are hereby incorporated by reference in their entirety.

TECHNICAL FIELD

A method, system and apparatus are provided in accordance with an example embodiment for optically measuring workpiece features, and more particularly, to optically measure internal surfaces of round bores and countersinks.

BACKGROUND

Manufacturing, and particularly precision manufacturing required for industries such as the aerospace industry, requires accurate machining of workpieces. Machining of workpieces involves many variables that affect the accuracy and precision of the machining operation. Reducing the variability of the variables involved in machining improves the quality of the machining operation while enhancing efficiency. One aspect of machining that has inherent variability is tool wear. As a machining tool wears, the capabilities of the tool are diminished. Inspecting machine tools for wear can be an expensive task both in terms of time (and machine downtime) and effort. Inspection of workpieces produced by wearing machine tools can also be expensive, and defects induced by worn tools may not be realized until the defect is substantial, risking scrapping of a machined part. While machining tools may be replaced based on a number of uses or duration of use, such replacement may lead to replacement of machine tools that have substantial tool life remaining, leading to unnecessary replacement at substantial expense. It is desirable to understand the life of machining tools based on their performance, while not overburdening the machining process with inspections, machining validation, and unnecessary tool replacement.

BRIEF SUMMARY

A method, system and apparatus are provided for optically measuring workpiece features, and more particularly, to optically measure internal surfaces of round bores and countersinks. Embodiments provide a probe including a probe base and a probe tip; a countersink camera having a countersink camera lens; a bore camera having a bore camera lens; and a laser source configured to generate a first laser cone and a second laser cone, where the probe tip defines a first reflective surface and a second reflective surface, where the first reflective surface is configured to receive the first laser cone and form a bore laser cone, where the second reflective surface is configured to receive the second laser cone and form a countersink laser cone, where the bore camera lens receives the bore laser cone reflected from a bore in response to the probe tip being received within the bore, and where the countersink camera lens is configured to receive the countersink laser cone reflected from a countersink in response to the probe tip being received within the countersink.

The laser source of an example embodiment includes a diffractive optical element to receive a laser beam and generate the first laser cone and the second laser cone. Embodiments include a forward-facing camera having a forward-facing camera lens; and a light source, where the forward-facing camera lens is configured to receive, through an aperture defined in the probe tip, light from the light source reflected from a workpiece. The first laser cone includes a first opening angle and the second laser cone includes a second opening angle, different from the first opening angle. According to some embodiments, the first reflective surface is positioned in the probe tip to receive the first laser cone at the first opening angle and the second reflective surface is positioned in the probe tip to receive the second laser cone at the second opening angle.

According to an example embodiment, the bore camera lens receives the bore laser cone reflected from a bore to a third reflective surface and to the bore camera lens in response to the probe tip being received within the bore. The countersink camera lens of some embodiments is configured to receive the countersink laser cone reflected from a countersink to a countersink beam reflector and to the countersink camera lens in response to the probe tip being received within the countersink. Embodiments include a controller configured to measure a surface of the bore in response to the bore laser cone received at the bore camera lens. The controller is configured to measure an exit burr from the bore in response to the probe advancing through an exit surface of the bore. The controller of some embodiments is configured to determine one or more dimensions of the bore and an exit burr in response to the bore laser cone received at the bore camera lens. The controller of some embodiments is configured to determine one or more dimensions of the countersink in response to the countersink laser cone received at the countersink camera lens. The probe tip of an example embodiment defines a first opening and a second opening, where the first reflective surface is disposed within the first opening and the second reflective surface is disposed within the second opening.

Embodiments provided herein include a system having a controller and a probe including: a probe base and a probe tip, the probe tip having a first reflective surface and a second reflective surface; a countersink camera within the probe tip having a countersink camera lens; a bore camera within the probe tip having a bore camera lens; and a laser source within the probe tip configured to generate a first laser cone and a second laser cone, where the first reflective surface is configured to receive the first laser cone and form a bore laser cone, where the second reflective surface is configured to receive the second laser cone and form a countersink laser cone, where dimensions of a bore are measured by the controller in response to the probe tip being received within the bore and the camera lens receiving the bore laser cone, where dimensions of the countersink are measured by the controller in response to the probe tip being received within the countersink and the countersink camera lens receiving the countersink laser cone.

According to an example embodiment, the first laser cone is received at the first reflective surface at a first opening angle and the second laser cone is received at the second reflective surface at a second opening angle, different from the first opening angle. The probe of some embodiments includes a third reflective surface, where the bore laser cone is received at the bore camera lens from the third reflective surface in response to the first laser cone being reflected from the first reflective surface to form the bore laser cone and the bore laser cone being reflected from the bore to the third reflective surface. The probe of some embodiments includes a countersink beam reflector, where the countersink laser cone is received at the countersink camera lens from the countersink beam reflector in response to the second laser cone being reflected from the second reflective surface to form the countersink laser cone and the countersink laser cone being reflected from the countersink to the countersink beam reflector. The controller of some embodiments is configured to determine one or more dimensions of the bore and one or more exit burrs in response to the probe advancing through the bore based on the bore laser cone received at the bore camera lens. The controller of some embodiments is configured to determine one or more dimensions of the countersink in response to the probe advancing through the countersink based on the countersink laser cone received at the countersink camera lens.

Embodiments provided herein include a method for measuring dimensions of a bore and countersink including: advancing a probe through a bore and a countersink; and measuring dimensions of the bore and the countersink based on a bore laser cone received at a bore camera lens and a countersink laser cone received at a countersink camera lens, where the bore laser cone is received at the bore camera lens in response to a first laser cone reflecting from a first reflective surface of the probe to form the bore laser cone and the bore laser cone being reflected from a surface of the bore to a third reflective surface of the probe and to the bore camera lens, and where the countersink laser cone is received at the countersink camera lens in response to a second laser cone reflecting from a second reflective surface of the probe to form the countersink laser cone, the countersink laser cone being reflected from a surface of the countersink to a countersink beam reflector and to the countersink camera lens.

According to some embodiments, methods include: generating from a laser source and a diffractive optical element, a first laser cone at a first opening angle, where the first laser cone is reflected at the first reflective surface to form the bore laser cone; and generating from the laser source and the diffractive optical element a second laser cone at a second opening angle, where the second laser cone is reflected at the second reflective surface to form the countersink laser cone, and where the second opening angle is different from the first opening angle. Methods of an example embodiment include identifying the bore in a workpiece based on light reflected from the workpiece to a forward-facing camera lens of the probe through an aperture defined in a probe tip of the probe. Measuring dimension of the bore and the countersink are performed, in some embodiments, based on a calibration table established for the probe. Methods of some embodiments include measuring dimensions of a burr on an exit surface of the bore in response to the probe advancing past the exit surface of the bore.

BRIEF DESCRIPTION OF THE DRAWINGS

Figure 1:
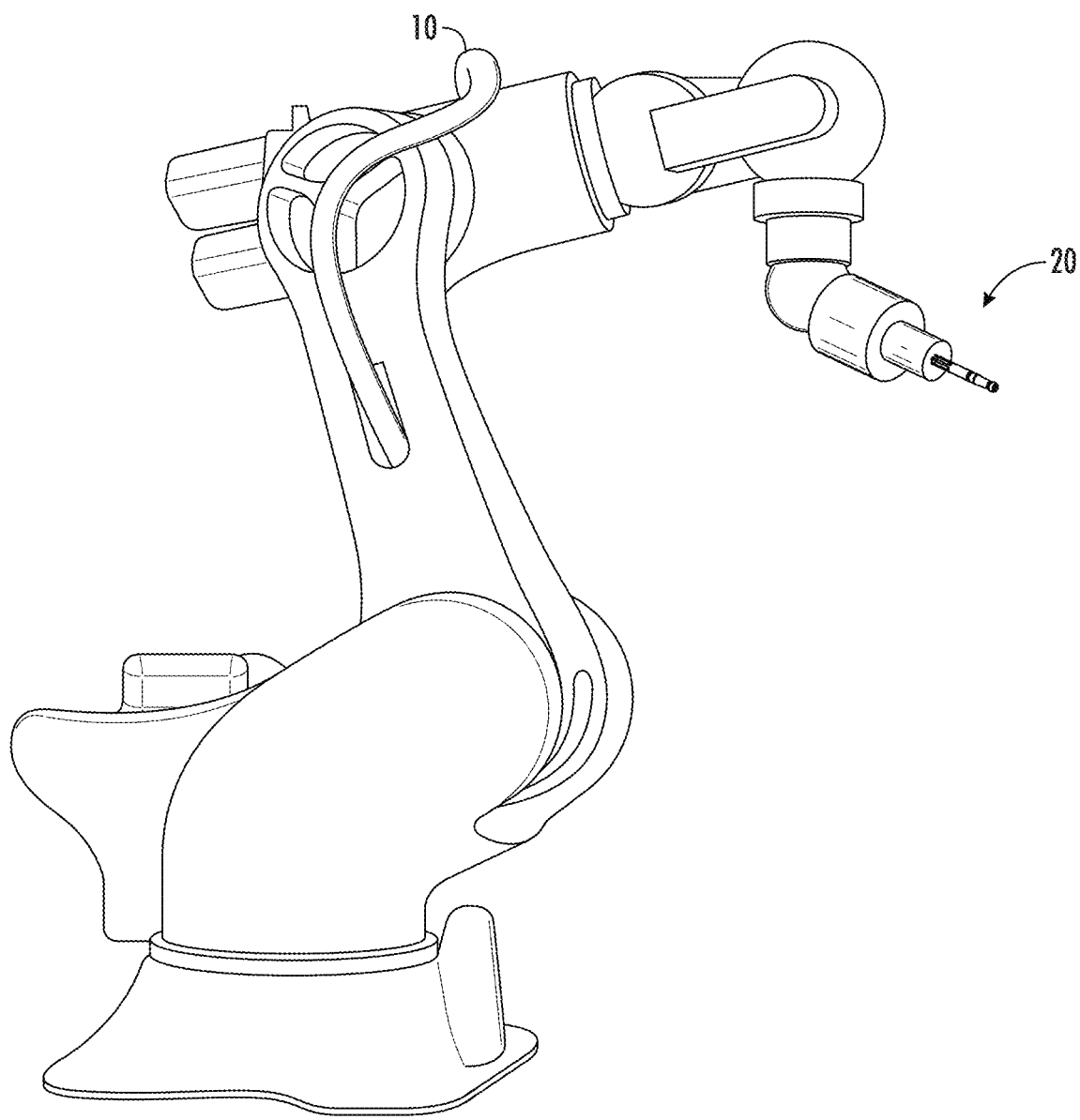
Figure 2:
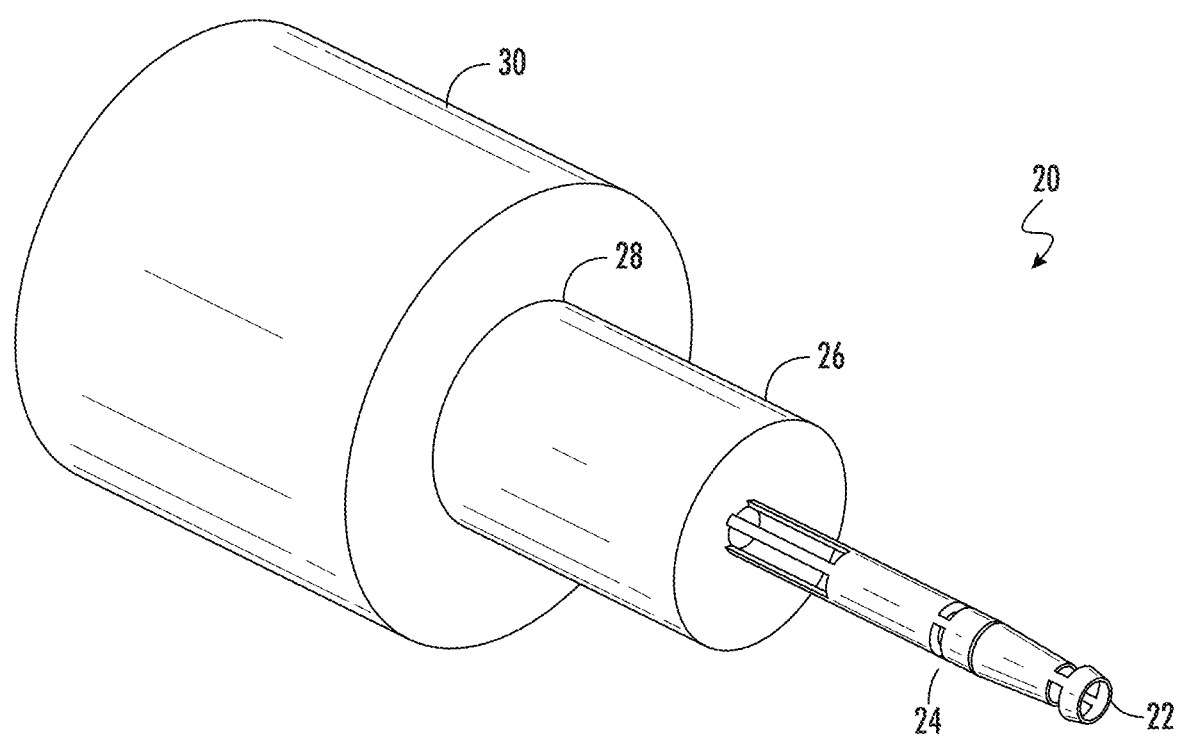
Figure 3:
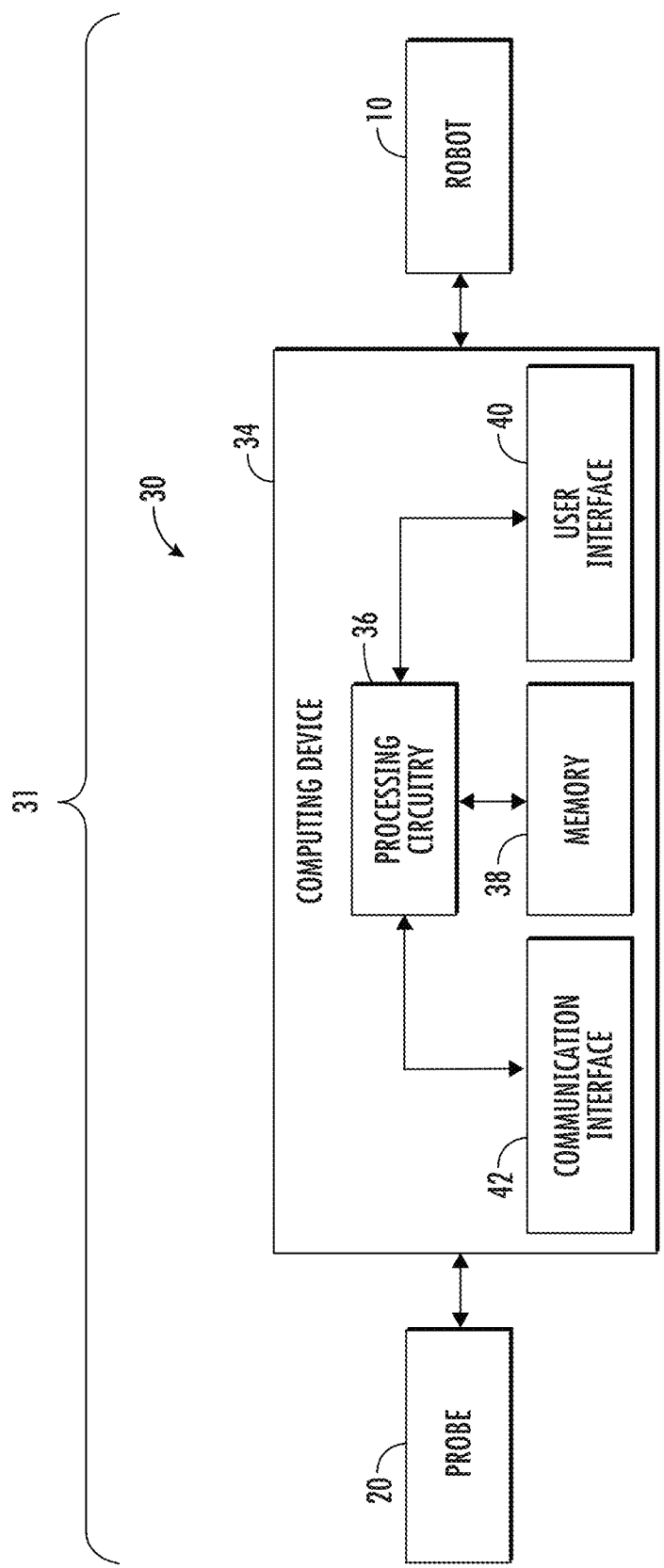
Figure 4:
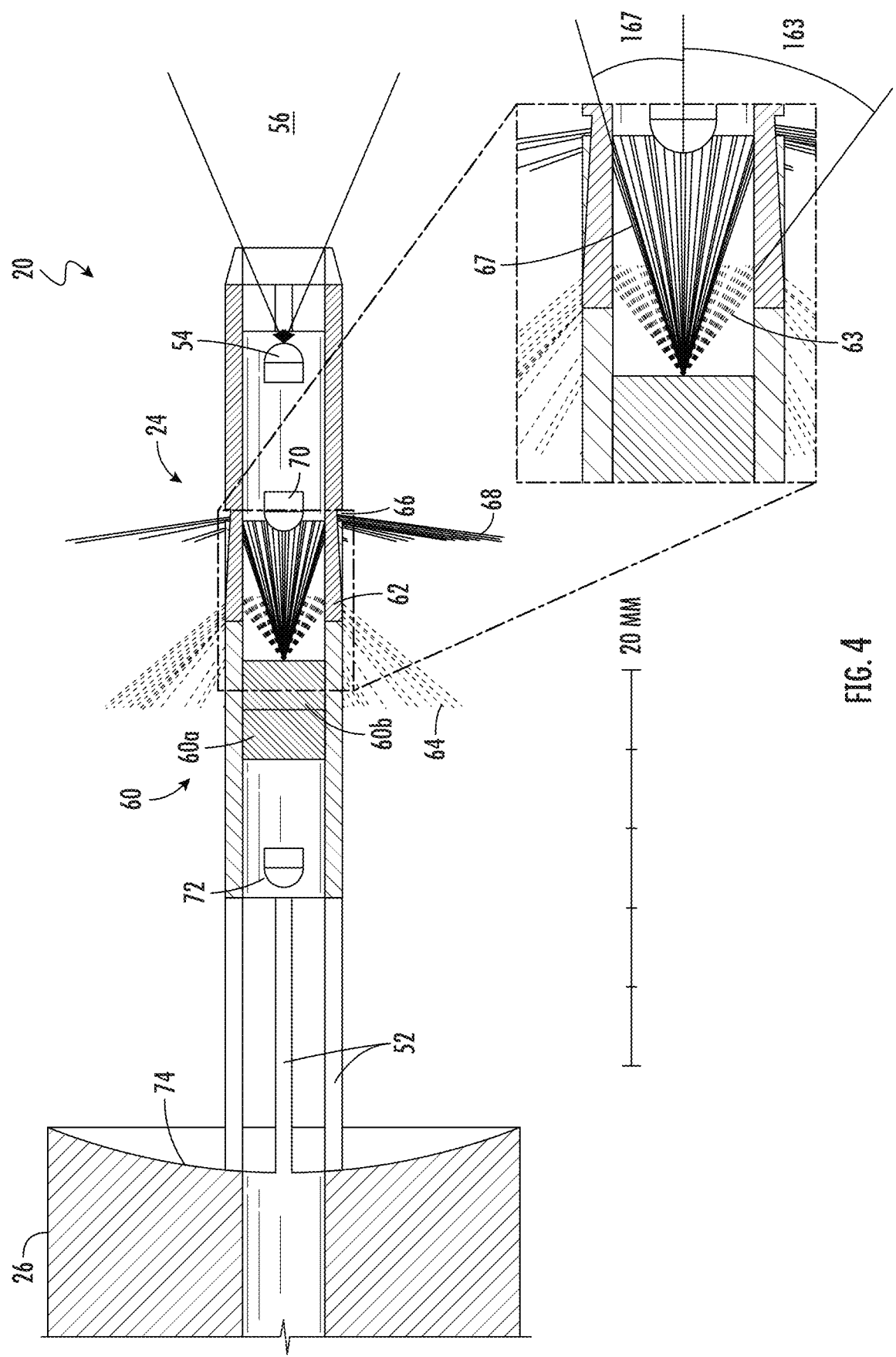
Figure 5:
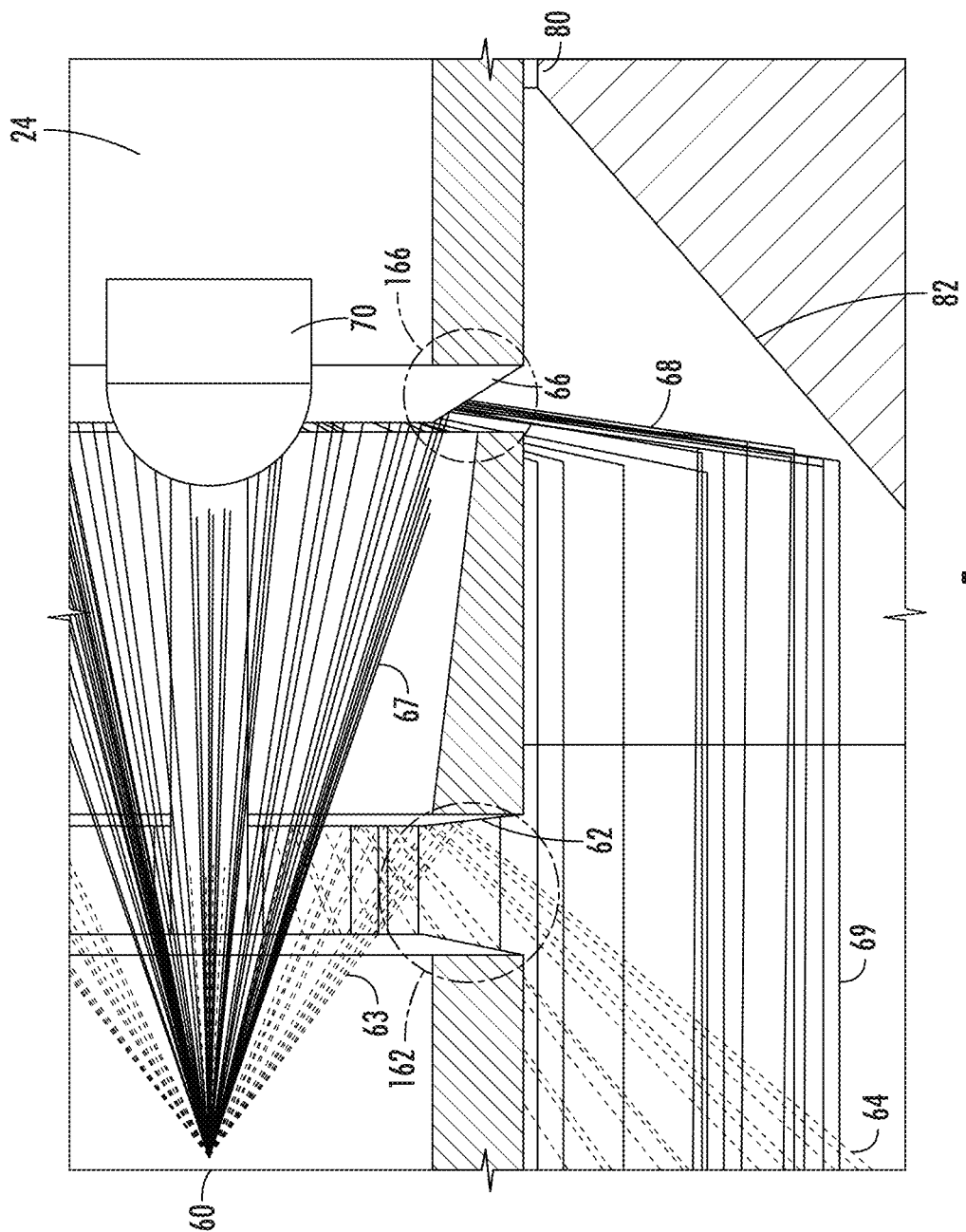
Figure 6:
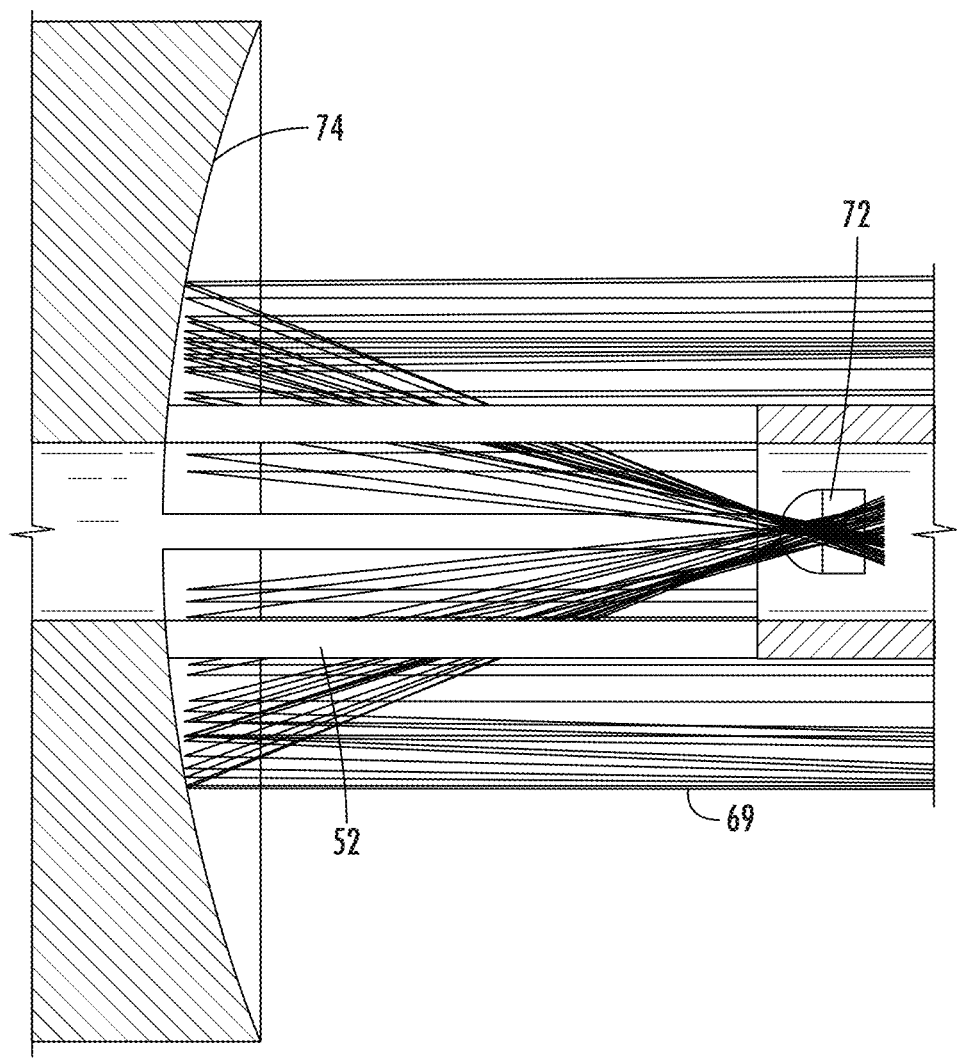
Figure 7:
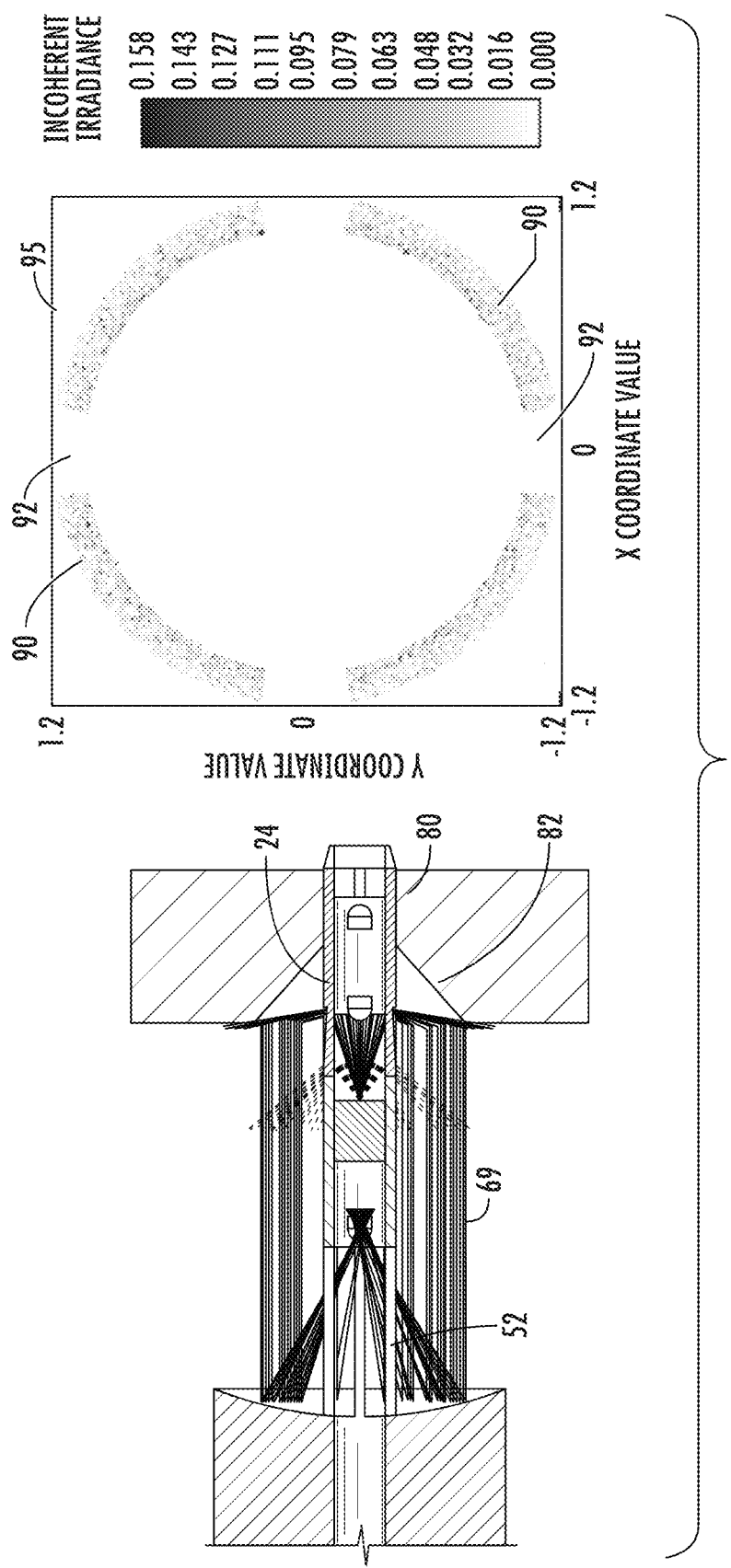
Figure 9:
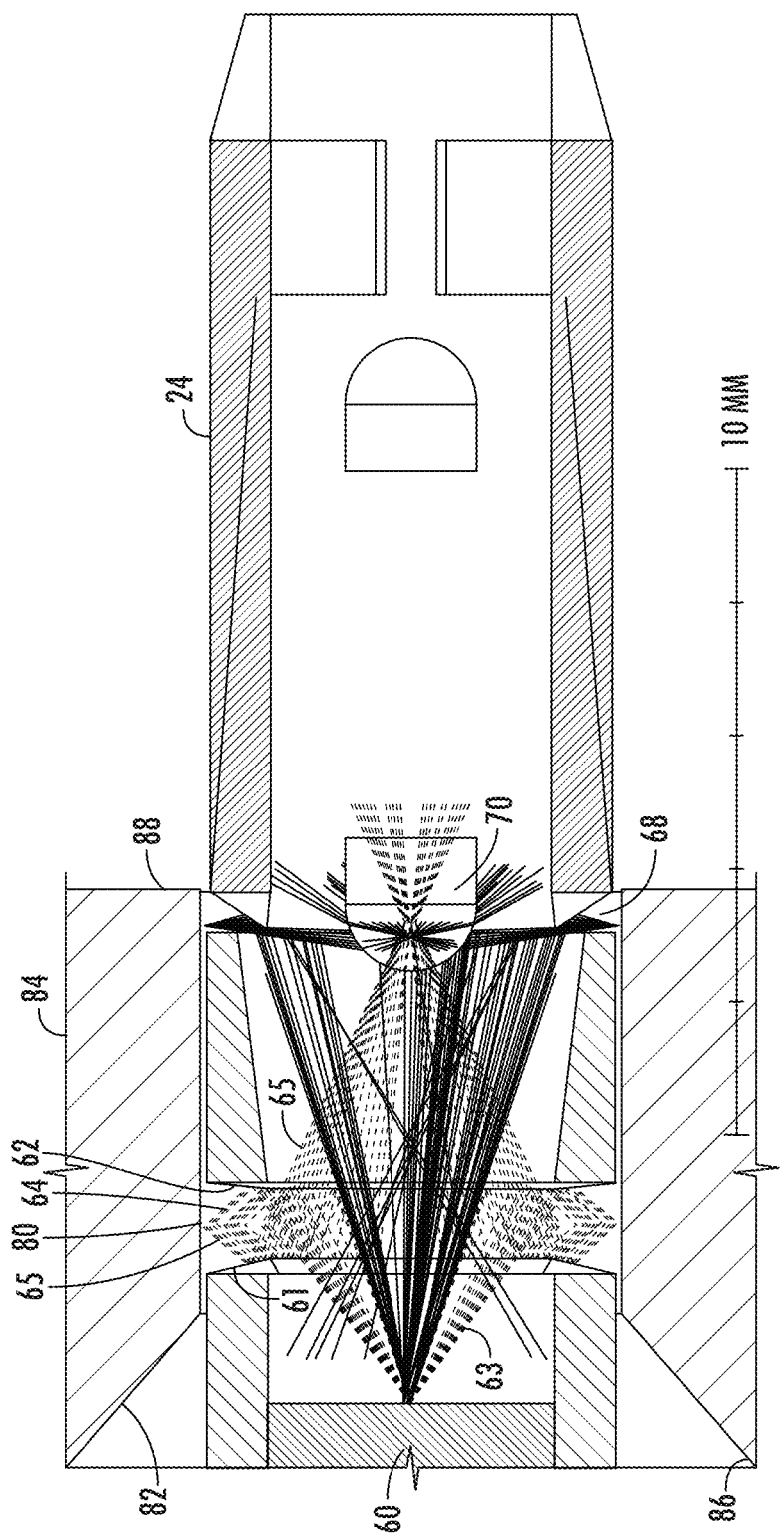
Figure 10:
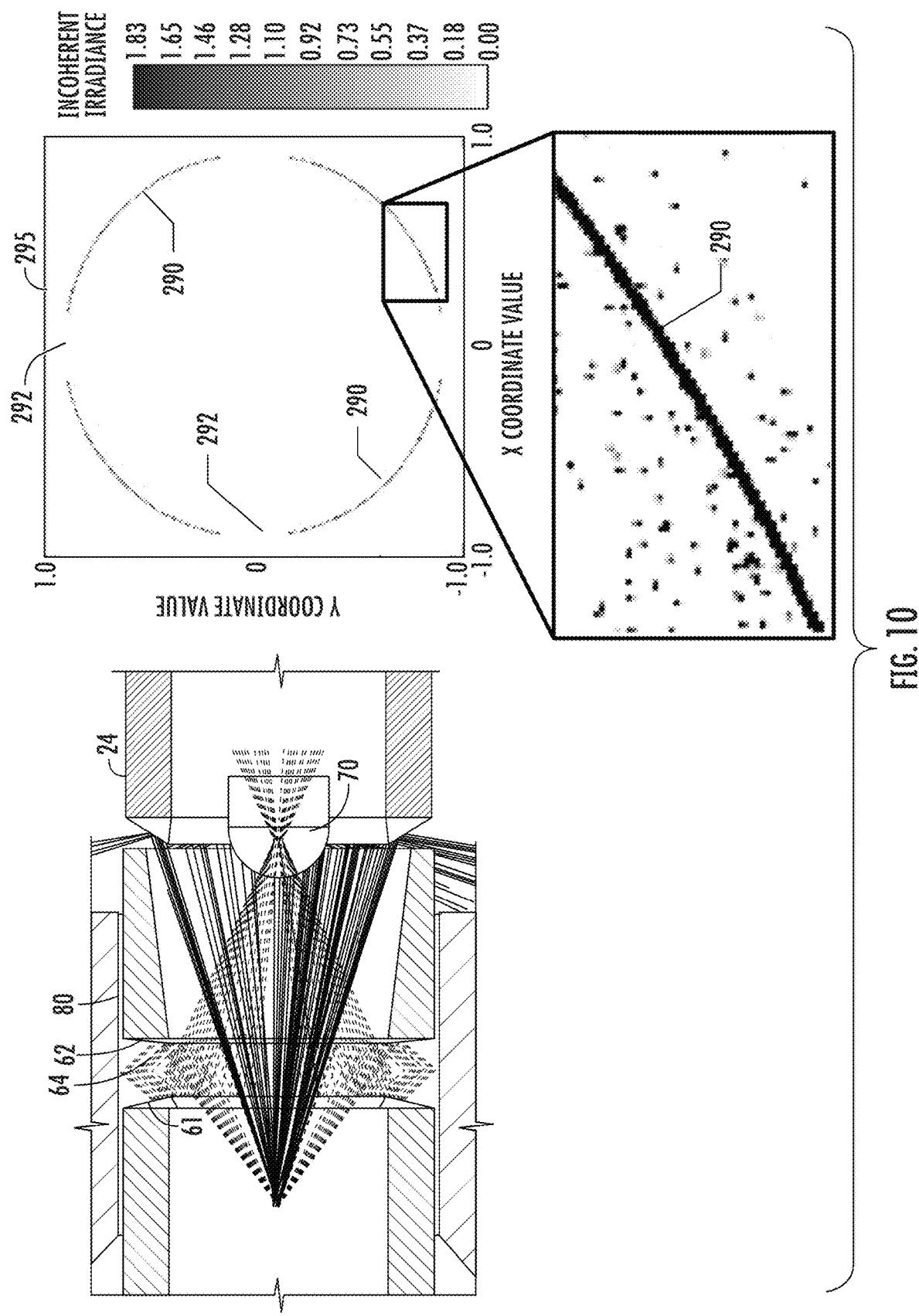
Figure 11:
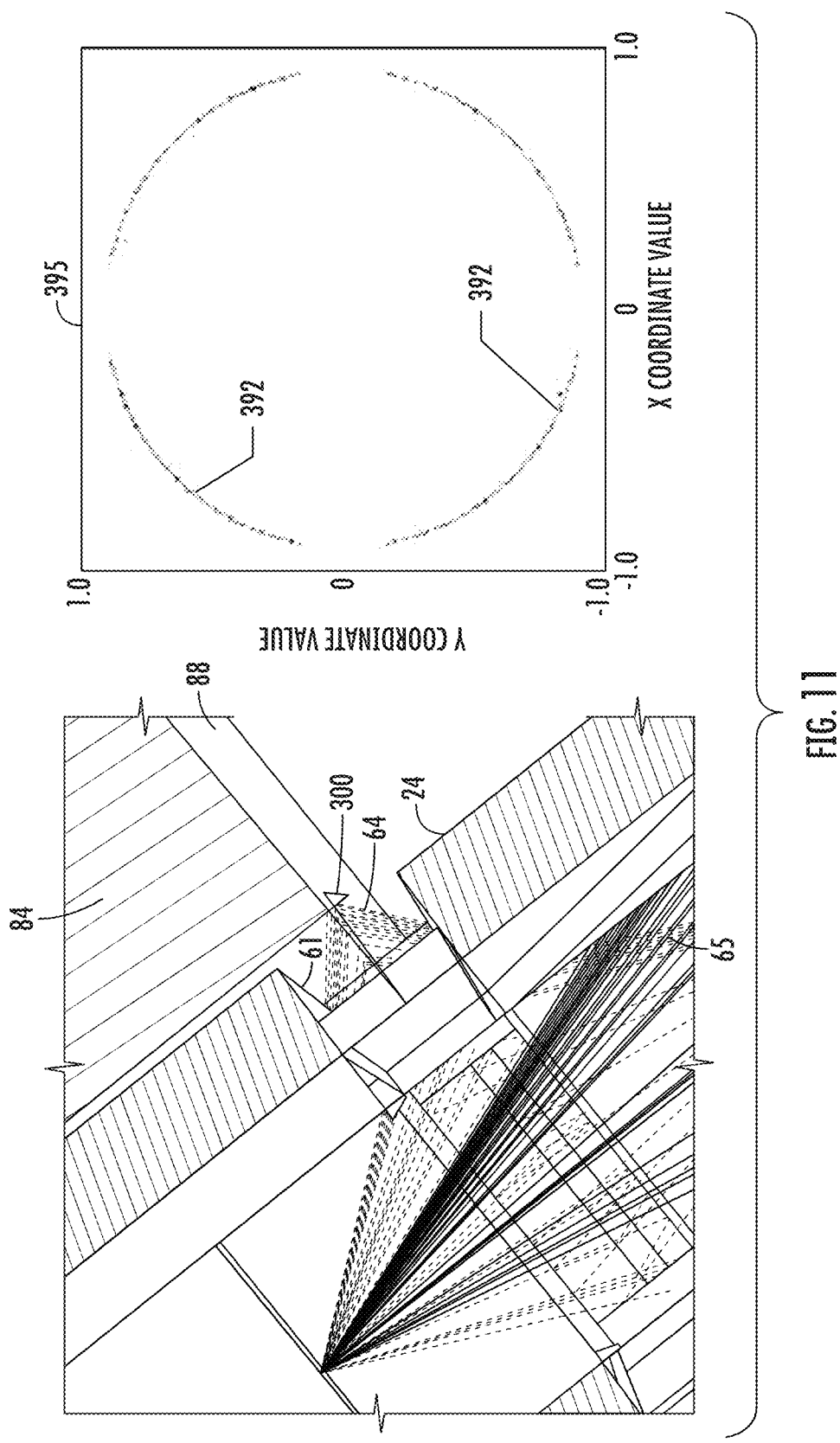
Figure 12:
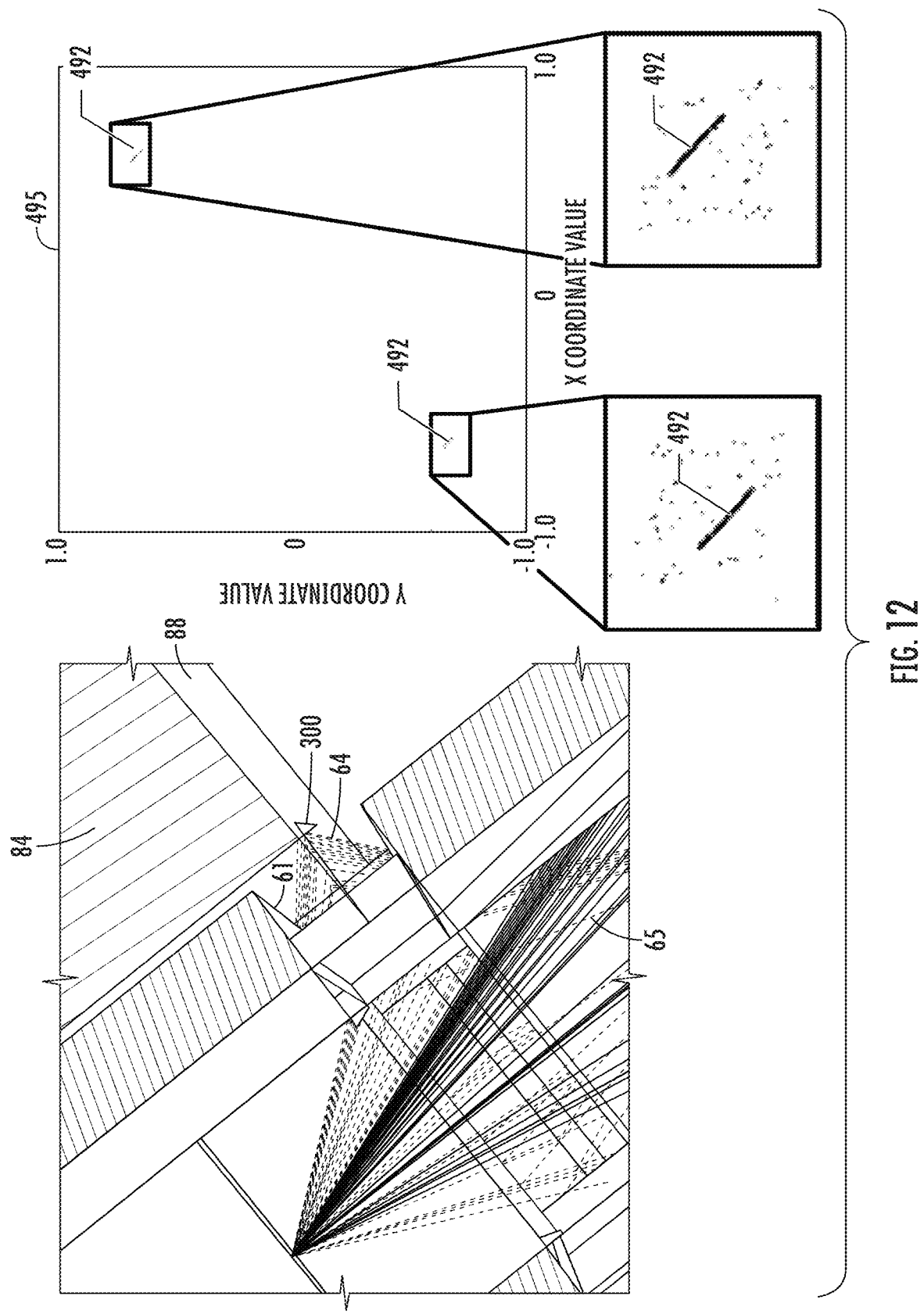
Figure 13:
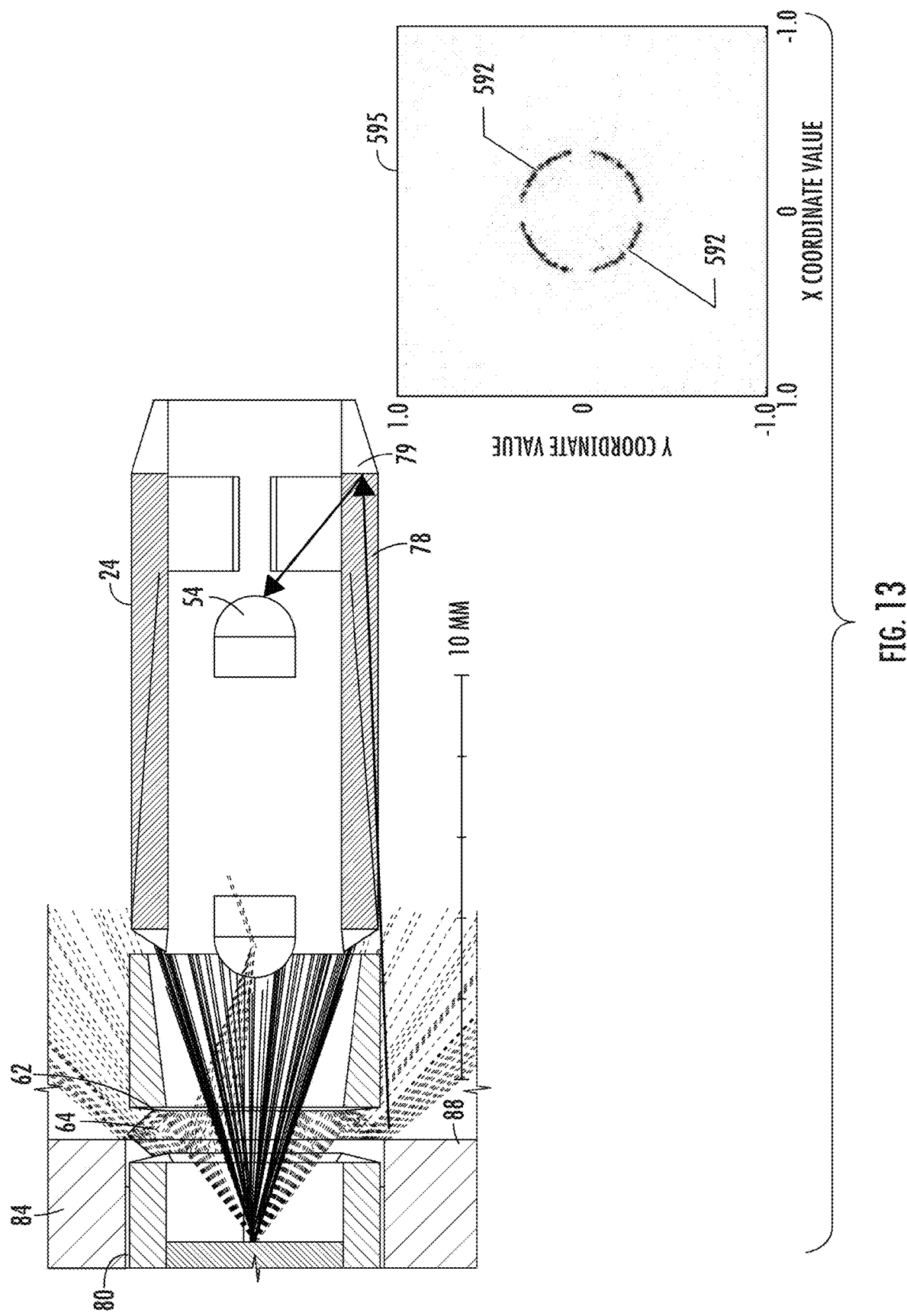
Figure 14:
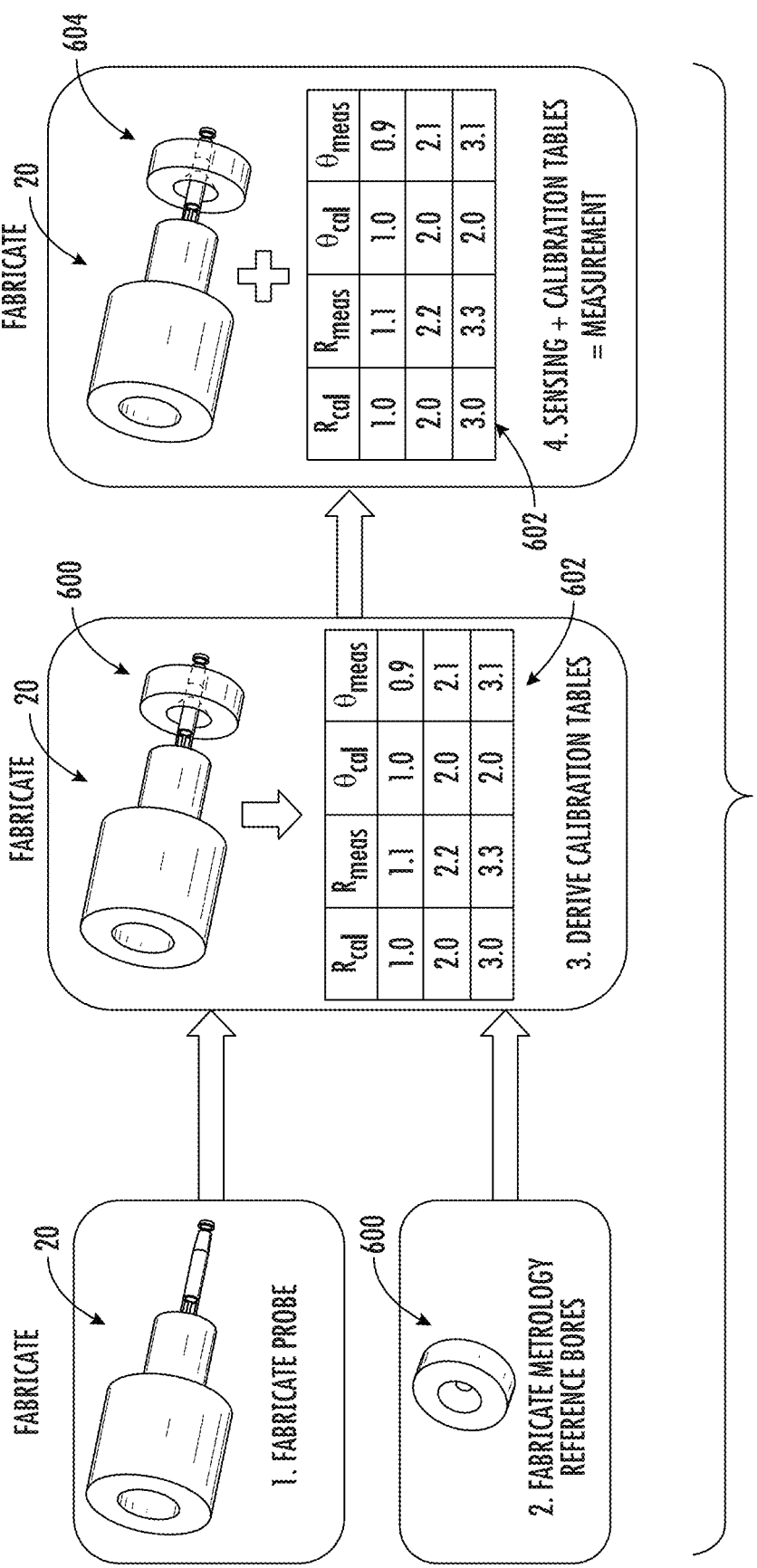
Figure 15:
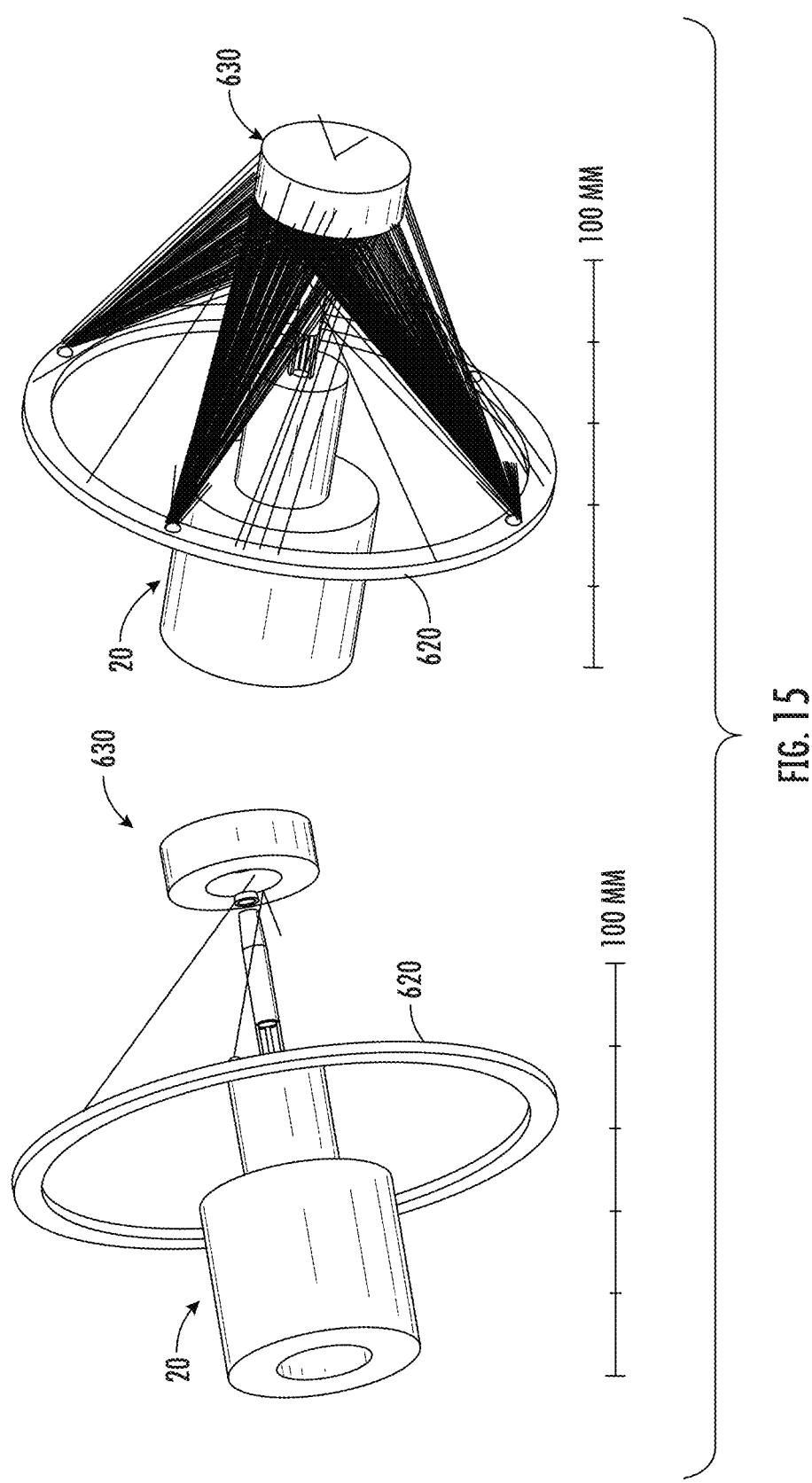
Figure 16:
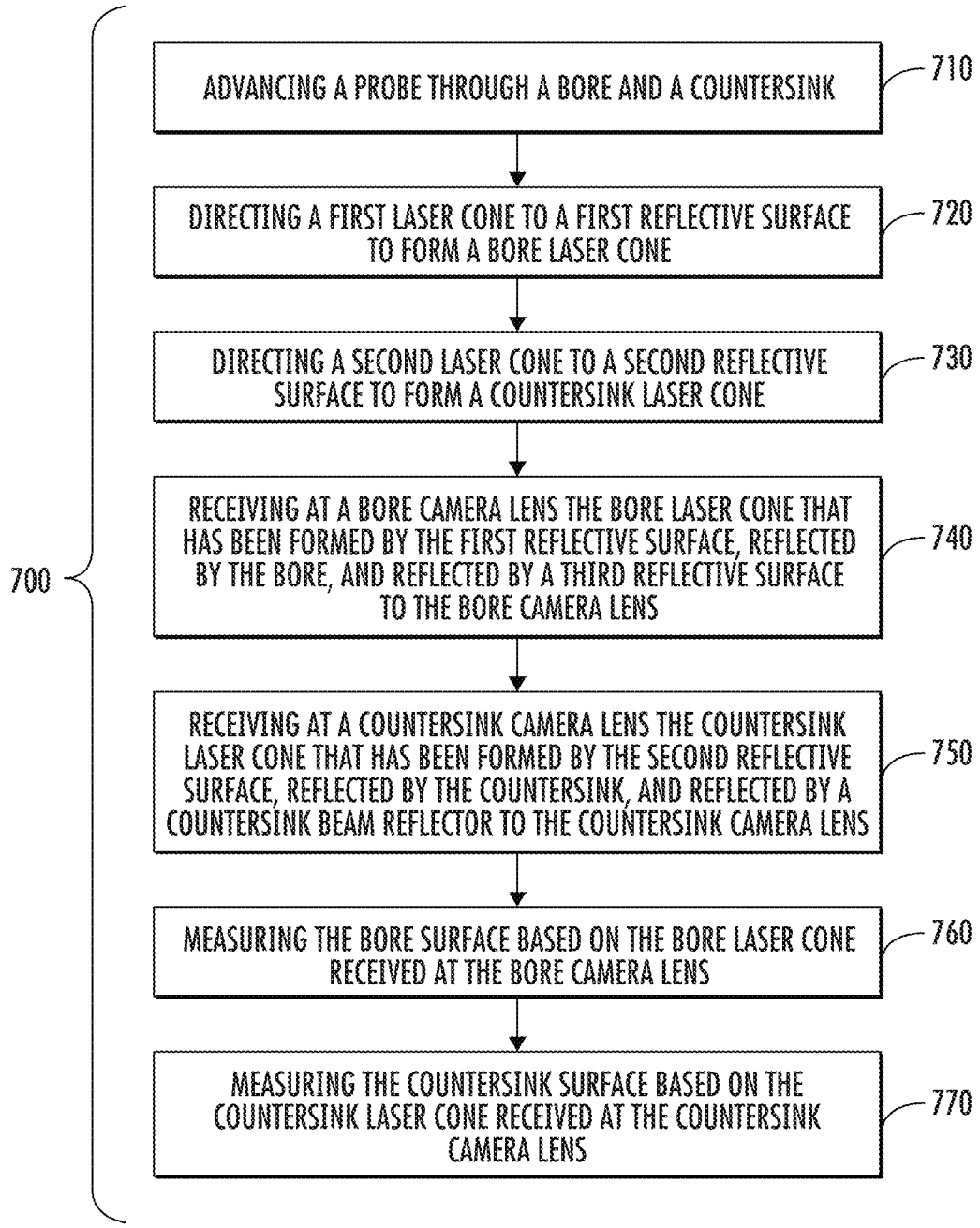

Having thus described certain example embodiments of the present disclosure in general terms, reference will hereinafter be made to the accompanying drawings which are not necessarily drawn to scale, and wherein:

FIG. 1 is a representation of a probe apparatus attached to an end effector of a robot according to an example embodiment of the present disclosure;

FIG. 2 illustrates a probe apparatus including a probe base and probe tip according to an example embodiment of the present disclosure;

FIG. 3 illustrates a system including controller configured to control a robot and/or a probe according to an example embodiment of the present disclosure;

FIG. 4 illustrates a cross-section view of a probe according to an example embodiment of the present disclosure;

FIG. 5 illustrates the bore laser cone and countersink laser cone formed from respective reflective surfaces according to an example embodiment of the present disclosure;

FIG. 6 illustrates the axial beam produced by the reflection of at least a portion of the countersink laser cone off of the countersink, collected at the countersink beam reflector, and directed to the countersink camera lens according to an example embodiment of the present disclosure;

FIG. 7 illustrates a probe tip entering a countersink and bore and an associated image, according to an example embodiment of the present disclosure;

FIG. 8 illustrates an image representing the countersink at a position proximate the bore according to an example embodiment of the present disclosure;

FIG. 9 illustrates the probe tip inserted through the workpiece and emerging from a back side of the workpiece according to an example embodiment of the present disclosure;

FIG. 10 illustrates the irradiance received at the bore camera lens in image with irradiated pixels with breaks as found in the images of the countersink according to an example embodiment of the present disclosure;

FIG. 11 illustrates a section view of the probe tip as it exits the back side of the workpiece and an associated image, according to an example embodiment of the present disclosure;

FIG. 12 illustrates a section view the probe tip as the bore laser cone exits the bore on the back side of the workpiece and an associated image, according to an example embodiment of the present disclosure;

FIG. 13 illustrates the bore laser cone reflected from the first reflective surface and scattered by the back surface of the workpiece and an associated image, according to an example embodiment of the present disclosure;

FIG. 14 illustrates a process of calibrating a probe using reference bores to generate a calibration table according to an example embodiment of the present disclosure;

FIG. 15 illustrates using off-axis illumination received in the forward-facing camera lens for insertion alignment of the probe according to an example embodiment of the present disclosure; and FIG. 16 is a flowchart of a process for optically scanning and measuring a bore and countersink according to an example embodiment of the present disclosure.

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

A method, system, and apparatus product are provided in accordance with an example embodiment described herein for optically measuring workpiece features, and more particularly, to optically measure internal surfaces of round bores and countersinks. Embodiments described herein include a unique capability of providing a means of measuring exit burr height. The modular design of example embodiments integrate low-cost mass-produced miniature components into a compact package requiring only electrical signals from a host interface. The probe described herein provides forward vision capability to support collision avoidance.

Automated manufacturing provides enhancements to efficiency and accuracy. However, routine measurement is necessary to ensure accuracy is maintained while tooling and machinery experience wear over time. One area in which accurate and repeatable automated manufacturing requires high precision is in aerospace. Holes drilled in aircraft components may be critical to a sound structure, where exit burrs may prove less than optimal and may be indicative of cutting tool wear or machining speed/force issues. For holes in joints, the number of allowable joint load cycles is known to be related to the exit burr height. In situ exit burr height measurement can reduce or eliminate the cost or need to measure cutting tool life, eliminate or reduce the recurring waste of residual cutting tool life, and eliminate or reduce recurring waste of validation upon cutting.

One technique for dealing with burrs is that a part may be manually de-burred, where an assembly may be clamped into a jig, machined/drilled, disassembled, de-burred, reassembled, gap-checked, and fastened. Such a process is both time-consuming and inefficient. Further, such a process is subject to human error. Another method for dealing with burrs may include one-up assembly. For every material stack and hole diameter condition, a non-recurring activity is used to determine a cutting tool's life in stack up representative coupons with statistical confidence. Once qualified, and during all subsequent recurring cutting operations, the number of holes cut per cutting tool must be counted, and cutting tools disposed of with statistical confidence before the cutting tool could cause excessive exit burr height. To ensure qualification validation, a work piece test coupon may need to be drilled before and/or after drilling the workpiece. This method is also time consuming and inefficient.

Embodiments described herein provide for optically measuring workpiece features, and more particularly, to optically measure internal surfaces of round bores and countersinks. Embodiments described herein provide for measurement of exit burr height to confirm exit burrs are within tolerance, thereby confirming cutting tool functionality. Embodiments described herein provide a low-cost method of measurement of machined holes and countersinks without suffering the inefficiencies of previous methods.

Embodiments described herein employ a multi-axis robot, such as the robot 10 illustrated in FIG. 1 configured to engage a probe 20 as an end-effector of the robot. The probe 20 may also be referred to as a bore optical scan sensor. The probe 20 may be a removable and replaceable component that is readily attached and detached to the robot 10. The robot of example embodiments is configured for the inspection of workpieces using the probe. The robot 10, together with the controller described further below and the probe 20, enables positioning and orientation within six degrees of freedom for measurement of a relatively small bore through a work piece. Embodiments enable the measurement of a bore and countersink surface and measurement of exit burr height, which provides the ability to identify tool wear or machining issues.

The probe 20 includes a probe tube having at least one laser source, cameras, and a geometry of angled reflectors enabling an integrated modular probe. Further, the use of inexpensive components and without requiring high-precision machining or molding of the probe results in a probe that is highly cost-effective and therefore substantially disposable and replaceable, as needed. Embodiments enable the efficient optical three-dimensional bore surface measurements of a countersink, bore, exit surface, and exit burr height. Accurate measurement of the exit surface enables material stack thickness measurement for identification of the ideal fastener length.

FIG. 2 illustrates an enlarged view of the probe 20 including a forward-vision open tip including opening 22, a modular probe tip 24, modular probe base 26, and the interface 28 to a robot tool holder 12. The interface may include electrical connections between the modular probe base 26 and the robot tool holder 12, along with a physical connection to mount the probe 20 to the robot. The physical connection may be a threaded connection, a frictional engagement, or the like. The robot tool holder 12 interfaces with the robot 10, where communication between a controller and the robot tool holder 12 may be wired or optionally wireless communication through a communication interface.

FIG. 3 illustrates a system 31 including controller 30 configured to control a robot 10 and/or a probe 20. The controller 30 includes a computing device 34 that has processing circuitry 36 in communication with a communication interface 42, a memory 38, and a user interface 40. The controller 30 may be in communication with one or both of the robot 10 and the probe 20 as shown.

The computing device 34 of controller 30 may be configured in various manners and, as such, may be embodied as a personal computer, a tablet computer, a computer workstation, a mobile computing device such as a smartphone, a server or the like. Regardless of the manner in which the computing device 34 is embodied, the computing device of an example embodiment includes or is otherwise associated with processing circuitry 36, memory 38, and optionally a user interface 40 and a communication interface 42 for performing the various functions herein described.

The processing circuitry 36 may, for example, be embodied as various means including one or more microprocessors, one or more coprocessors, one or more multi-core processors, one or more controllers, one or more computers, various other processing elements including integrated circuits such as, for example, an ASIC (application specific integrated circuit) or FPGA (field programmable gate array), or some combination thereof. In some example embodiments, the processing circuitry 36 is configured to execute instructions stored in the memory 38 or otherwise accessible to the processing circuitry. These instructions, when executed by the processing circuitry 36, may cause the computing device 34 and, in turn, the controller 30 to perform one or more of the functionalities described herein. As such, the computing device 34 may comprise an entity capable of performing operations according to an example embodiment of the present disclosure while configured accordingly. Thus, for example, when the processing circuitry 36 is embodied as an ASIC, FPGA or the like, the processing circuitry and, correspondingly, the computing device 34 may comprise specifically configured hardware for conducting one or more operations described herein. Alternatively, as another example, when the processing circuitry 36 is embodied as an executor of instructions, such as may be stored in the memory 38 the instructions may specifically configure the processing circuitry and, in turn, the computing device 34 to perform one or more algorithms and operations described herein.

The memory 38 may be a non-transitory memory and include, for example, volatile and/or non-volatile memory. The memory 38 may comprise, for example, a hard disk, random access memory, cache memory, flash memory, an optical disc (e.g., a compact disc read only memory (CD- ROM), digital versatile disc read only memory (DVD-ROM), or the like), circuitry configured to store information, or some combination thereof. In this regard, the memory 38 may comprise any non-transitory computer readable storage medium. The memory 38 may be configured to store information, data, applications, instructions, or the like for enabling the computing device 34 to carry out various functions in accordance with example embodiments of the present disclosure. For example, the memory 38 may be configured to store program instructions for execution by the processing circuitry 36.

The user interface 40 may be in communication with the processing circuitry 36 and the memory 38 to receive user input and/or to provide an audible, visual, mechanical, or other output to a user. As such, the user interface 40 may include, for example, a display for providing an image captured by the probe 20 or measured output from the probe 20 as described further below. Other examples of the user interface 40 include a keyboard, a mouse, a joystick, a microphone and/or other input/output mechanisms.

The communication interface 42 may be in communication with the processing circuitry 36 and the memory 38 and may be configured to receive and/or transmit data. The communication interface 42 may include, for example, one or more antennas and supporting hardware and/or software for enabling communications with a wireless communication network. Additionally or alternatively, the communication interface 42 may include the circuitry for interacting with the antenna(s) to cause transmission of signals via the antenna(s) or to handle receipt of signals received via the antenna(s). In some environments, the communication interface 42 may alternatively or also support wired communication.

FIG. 4 illustrates a cross-section view of a probe 20 according to embodiments of the present disclosure. As shown, the probe tip 24 extends from the probe base 26 and is supported by support struts 52. The probe tip 24 includes laser diodes and camera lenses to provide bore surface measurements as described herein. As shown, the probe tip includes a forward-facing camera lens 54 of a forward-facing camera or image capture device with forward vision field of view 56 through an aperture defined in the probe tip. The forward-facing camera lens 54 is used for general alignment and insertion as will be described in greater detail below. The probe tip 24 also includes a laser source 60 including a laser diode 60*a* and diffractive optical element 60*b*, where the diffractive optical element 60*b* is configured to receive a laser beam from the laser diode 60*a* and generate two laser cones. The diffractive optical element 60*b* which may also be referred to as a pattern generator or beam shaper is configured to receive the laser light from the laser diode and form the two laser cones. Optionally, two diffractive optical elements may be used whereby a first diffractive optical element forms a first cone and allows a portion of the laser to pass through the first diffractive optical element to a second diffractive optical element that may take at least a portion of the remaining laser light reaching the second diffractive optical element and form the second cone. The one or more diffractive optical elements thereby forms two laser cones having different opening angles as described further below. The first laser cone 63 emitted at a first opening angle 163 from the diffractive optical element forms the bore laser cone 64 which is reflected from a first reflective surface 62 of the probe tip 24 to impinge on a bore as described further below.

The probe tip is configured with openings through the body of the probe tip and reflective surfaces in the probe tip which will be shown and described in greater detail below. The second laser cone 67 emitted at a second opening angle 167 from the diffractive optical element, less than the first opening angle 163 of the first laser cone 63, forms the countersink laser cone 68 that is reflected from a second reflective surface 66 of the probe tip 24 to impinge on a countersink as described further below. The bore laser cone 64 and countersink laser cone 68 are arranged at different angles relative to one another to provide accurate measurements of different aspects of a bore and countersink. The first opening angle 163 of the first laser cone 63 and the second opening angle 167 of the second laser cone 67 are determined based on a position of the laser diode 60*a* and the diffractive optical element 60*b* relative to the first reflective surface 62 and the second reflective surface 66. The opening angles are established such that the first laser cone 63 is received at the first reflective surface 62 to form the bore laser cone 64 and the second laser cone 67 is received at the second reflective surface 66 to form the countersink laser cone 68.

The probe tip 24 cross-section of FIG. 4 also includes a bore camera lens 70 of a bore camera or bore image capture device and a countersink camera lens 72 of a countersink camera or countersink image capture device. The bore camera lens 70 is arranged to receive a portion of the bore laser cone 64 reflected from a bore being inspected, while the countersink camera lens 72 is arranged to receive a portion of the countersink laser cone reflected from a countersink of the bore being inspected. As will be described below with respect to FIG. 6, the countersink camera lens 72 receives a portion of the countersink laser cone reflected from the countersink of the bore being inspected that is gathered at the countersink beam reflector 74 before being returned to the countersink camera lens 72.

The area within the probe tip 24 through which beams are passing as they are emitted and received by a respective camera lens may be hollow and exposed to the environment of the workpiece during use. However, according to some embodiments, the area within the probe tip may be filled with an optical-grade epoxy that allows the beams from the laser diode 60*a* and diffractive optical element 60*b* to pass through the optical-grade epoxy without diffraction such that the beams are received at the respective camera lenses as if the optical-grade epoxy was not present. Filling the area within the probe tip 24 with optical-grade epoxy improves the robustness of the probe tip 24 such that minor contact of the probe tip with the workpiece (e.g., the bore or the countersink) may not ruin the probe tip 24 or affect the accuracy of the probe 20. Further, employing optical-grade epoxy in the voids within the probe tip 24 may allow the support struts 52 to be smaller as they are less structurally relied upon to support the probe tip 24. Reducing the size of the support struts 52 reduces the amount of obstruction to the beams as they are reflected to the camera lenses.

FIG. 5 illustrates how the bore laser cone 64 and countersink laser cone 68 emanate from respective reflective surfaces. FIG. 5 depicts a partial view of the probe tip 24 entering a bore 80 having countersink 82. The laser source 60 including laser diode 60*a* and diffractive optical element 60*b* produces first laser cone 63 which enters first opening 162 and is reflected from the first reflective surface 62 of first opening 162 forming the bore laser cone 64 that is scattered as the probe tip 24 is not sufficiently inserted into the bore 80 for the bore laser cone 64 to meet an inner surface of the bore 80. The controller 30 is configured to measure a surface of the bore 80 in response to the bore laser cone 64 received at the bore camera lens 70. The controller 30 is also configured to measure one or more dimensions of the bore 80 in response to the bore laser cone 64 received at the bore camera lens 70. The laser diode 60a and diffractive optical element 60b also produces second laser cone 67 which enters second opening 166 and is reflected from the second reflective surface 66 of second opening 166 to form the countersink laser cone 68, which impinges on the countersink 82 and is reflected, at least in part, by the countersink 82 forming an axial beam 69 that is received at the countersink beam reflector 74 of FIG. 4 and collected/reflected to the countersink camera lens 72.

As shown in FIG. 5, the first reflective surface 62 defined within first opening 162 is configured to receive the first laser cone 63 and form a bore laser cone 64. The second reflective surface 66 defined within second opening 166 is configured to receive the second laser cone 67 and form the countersink laser cone 68. The bore camera lens 70 receives the bore laser cone 64 reflected from a bore in response to the probe tip being received within the bore as will be further illustrated and described with respect to FIG. 9 below. The countersink camera lens 72 receives the countersink laser cone 68 reflected from a countersink in response to the probe tip 24 being received within the countersink as will be further illustrated and described with respect to FIGS. 7 and 8 below.

The first opening 162 and second opening 166 are openings or cut-outs in the probe tip 24 that allow the first laser cone 63 and the second laser cone 67 to pass through to respective reflective surfaces to form the bore laser cone 64 and the countersink laser cone 68. The first opening 162 is a one of a first plurality of openings around the probe tip 24 allowing the first laser cone 63 to pass through to first reflective surface 62. Similarly, the second opening 166 is one of a second plurality of openings disposed around the probe tip 24 allowing the second laser cone 67 to pass through to second reflective surface 66. The first plurality of openings may include, for example, three cut-outs or openings around the probe tip 24 where each opening is close to 120 degrees, or the first plurality of openings around the probe tip 24 may include four openings with each opening close to 90 degrees. Regardless of the number of openings, a portion of the probe tip may extend between each of the first plurality of openings to provide support for the probe tip 24. Similarly, the second plurality of openings may include two, three, or four openings about the body of the probe tip 24 with portions of the probe tip 24 extending between each of the openings. The portions of the probe tip 24 extending between the openings may be sized to be a small portion of the circumference of the probe tip 24 to allow the bore laser cone 64 and/or the countersink laser cone 68 to cover as much of the area around the probe tip as possible. As described further below, voids and openings of the probe tip may be filled with an optical-grade epoxy to enhance strength and robustness of the probe tip while enabling the openings to be larger.

As the probe tip 24 is inserted into the bore 80 past the countersink 82, the countersink laser cone 68 impinges upon the countersink from an opening of the countersink at the surface of the workpiece, to the bore 80. This produces a sequence of images of the countersink that are effectively images of slices of the countersink 82. Each of these slice images will reveal any surface anomalies including burrs and voids, and from the images, a burr height or void size can be established.

FIG. 6 illustrates the axial beam 69 produced by the reflection of at least a portion of the countersink laser cone 68 off of the countersink, collected at the countersink beam reflector 74, and directed to the countersink camera lens 72. FIG. 7 illustrates the image captured by the countersink camera lens 72 based on the reflected countersink laser cone 68 forming an axial beam and being reflected off the countersink beam reflector 74. The controller 30 is configured to measure the surface of the countersink in response to the countersink laser cone 68 being reflected at the countersink beam reflector 74 and collected at the countersink camera lens 72 to produce image 95 of pixels irradiated by the countersink laser cone 68. The image 95 produced includes the reflected axial beam 69 as it was reflected into the countersink camera lens 72 irradiating pixels to form the image. As shown, the beam appears a relatively scattered though a discernable image of irradiated pixels 90 representing the "slice" of the countersink 82. The breaks 92 in the irradiated pixels 90 are caused by the support struts 52 casting a shadow and impeding the countersink laser cone. This slice is taken proximate the opening of the bore 80 at the workpiece surface, where the bore 80 is widest. The peak irradiance measured at the countersink camera lens 72 is 0.158 Watts per centimeter squared ($W/cm^2$). The image is 1000 pixels wide by 1000 pixels high, and 2.4 millimeters wide by 2.4 millimeters high. The more sparse distribution of irradiated pixels of the irradiated pixels 90 are the result of beam scatter of the countersink laser cone 68 traveling further to reach the extremities of the countersink 82.

Conversely, FIG. 8 illustrates an image 195 representing the countersink 82 at a position proximate the bore 80. As shown, the slice of the countersink 82 proximate the bore 80 produces irradiated pixels 190 that have more sharply defined edges and greater pixel resolution, with an irradiance of 0.25 $W/cm^2$. The irradiated pixels 190 also include breaks 192 caused by the support struts 52. The geometry of the countersink is established based on the measurements taken using the probe as described herein. The outermost diameter of the countersink is identified where the countersink laser cone 68 begins to be received at the countersink camera lens 72. The angle of the countersink can be established through measurement of the diameter of the countersink at any two depths, and using the distance the probe tip 24 was advanced between those two measurements, as measured by the robot 10.

The robot 10 advancing the probe 20 to a countersink and bore of a work surface may do so through coordinate locations of a machined countersink and bore in a workpiece. Optionally, the probe 20 may be advanced to a countersink and bore of a work surface through visual identification using, for example, a camera. The forward-facing camera of the forward-facing camera lens 54 may be used for general alignment of the probe tip 24 with the countersink and bore of the work surface. The alignment performed visually, based on coordinate locations, or a combination thereof may position the probe tip 24 sufficiently close to the countersink to enable initial measurements to be taken. As shown in FIG. 7, the probe tip 24 is entering the countersink 82 and the bore 80. Embodiments of the probe 20 apparatus described herein may provide further alignment and orientation based on measurement of the countersink 82 and/or bore 80.

As the probe tip 24 approaches the countersink 82 and measurement of the surface and countersink commence, a non-circular (i.e., elliptical) countersink or bore indicates that the probe tip 24 is not axially aligned with the bore 80. The height and width of the initial arcs received by the countersink camera lens 72 are used to determine alignment and normality of the probe tip 24 with the work surface and bore 80 there through. Embodiments described herein provide a feedback loop to the controller 30 whereby alignment instructions are generated and provided to the robot 10 to align the probe tip 24 with the bore 80. The alignment instructions provide end-effector rotation axis and degree to enable the probe tip 24 to become aligned with the bore 80. In practice, as the probe tip 24 approaches the countersink 82 and bore 80, measurements identifying the countersink 82 or bore 80 as elliptical may cause the robot to cease advancement of the probe tip 24 into the bore 80. Alignment of the probe tip 24 may commence with the rotation of the robot end effector to correct the axial alignment of the probe tip 24 with the bore 80. Axial alignment is identified as achieved when the measurement of the bore 80 or countersink 82 provides a circular resultant shape.

FIG. 9 illustrates the probe tip 24 inserted through the workpiece 84 and emerging from an exit surface 88 of the workpiece, where the countersink 82 is disposed on a front side 86 of the workpiece 84. The illustrated embodiment of FIG. 9 depicts measurement of the bore 80 as the bore laser cone 64 remains within the bore 80. The illustrated cross-section view depicts the first laser cone 63 emitted from the laser diode 60a and diffractive optical element 60b and reflecting from first reflective surface 62 forming the bore laser cone 64. The bore laser cone 64 reaches the bore 80 and is reflected back to another reflective surface (i.e., third reflective surface 61), that reflects the beam from the bore laser cone 64 to the bore camera lens 70 along beam path 65. The countersink laser cone 68 is also depicted; however, due to their angle of incidence in the bore 80, the countersink laser cone 68 is reflected away from interfering with the bore laser cone that is received at the bore camera lens 70.

FIG. 10 illustrates the irradiance received at the bore camera lens in image 295 with irradiated pixels 290 with breaks 292 as found in the images of the countersink. The X, Y pixel locations in the image correspond to the hole diameter at the point of measurement. The image is 2.0 millimeters wide and 2.0 millimeters high, and the irradiance of the image 295 of FIG. 10 is 0.183 W/cm$^2$.

FIG. 11 illustrates a section view of the probe tip 24 as it exits the exit surface 88 of the workpiece 84. As it is exiting, a substantially normal bore slice is seen in image 395 with irradiated pixels 392. However, as seen in the cross-section image of the probe tip 24 exiting the workpiece 84, there is an exit burr 300 at the exit surface 88 of the workpiece 84, not yet reached by the bore laser cone 64. FIG. 12 illustrates a section view the probe tip 24 as the bore laser cone 64 exits the bore 80 on the exit surface 88 of the workpiece 84. At the illustrated point, the bore laser cone has encountered the exit burr 300, where there is a corresponding burr diametrically opposed to the illustrated burr. As shown in the image 495, the diameter of the bore is no longer seen since the bore laser cone no longer impinges on the inside of the bore 80. However, irradiated pixels 492 illustrate exit burrs 300 at the exit surface 88 surface of the workpiece 84. The controller 30 is configured to measure one or more dimensions of the burr 300 in response to the bore laser cone 64 reflected from the burr 300 and received at the bore camera lens 70. The presence of these irregularities provides an indication of surface anomalies in the form of burrs, while the travel distance of the probe tip 24 between the last indication of the bore 80 diameter and the last indication of the exit burrs 300 in irradiated pixels 492 provide a height of the exit burrs 300. In the illustrated embodiment, for example, the exit burr 300 is detected as having an arc length of 0.27 inches, and a height of 0.003 inches.

As the probe tip 24 continues to pass through the bore 80, the probe tip exits the exit surface 88 of the workpiece 84. The bore laser cone 64, reflecting from first reflective surface 62 no longer impinges on the bore 80 as shown in FIG. 13. Rather, the bore laser cone 64 is reflected from first reflective surface 62 and scattered by the exit surface 88 of the workpiece 84. Diffuse reflected rays follow path 78 and are reflected from surface 79 to reach forward-facing camera lens 54, producing a diffuse image 595 of the edge of the bore. The diffuse image provides the distance to the back surface and may include irradiated pixels 592 depicting indications of the burrs on the exit surface 88 of the workpiece 84 where pixels in the vicinity of the burrs may be more diffuse due to the irregular surface at the locations of the burrs.

The probe 20 of example embodiments described herein therefore is able to provide precise measurement of a countersink and bore, and to identify surface anomalies including burrs of only thousandths of an inch. Further, the probe 20 described herein is constructed of inexpensive components such that probes may be disposable. As measurement probes of the scale described herein are susceptible to damage due to their size and function, a precise measurement tool that is low cost is highly desirable.

To maintain a low production cost of probes as described herein, the probes may be manufactured with relatively wide tolerances with respect to the finite measurements the probes are able to make. As such, each probe may be uniquely calibrated to compensate for any manufacturing variations. Calibration may be performed at the time of manufacture or by an end-user to generate a calibration table that is unique to each probe. Embodiments described herein may use metrology reference bores 600 to calibrate probe 20, as depicted in FIG. 14. The calibration procedure may proceed in substantially the same manner as described above with respect to measurement of a countersink and bore. The precise dimensions of the reference bores 600 are known, such that measurements taken with the probe 20 can be compared against the known reference bore. From the differences between the measurements of the probe 20 and the reference bore 600, a calibration table 602. The reference table may include calibration parameters for a variety of different elements of the probe 20. For example, the angular offset of the probe tip 24 relative to the probe base 26 may be identified, along with internal component calibration parameters, such as an angular offset of each of the camera lenses, an angular offset of the beams, a rotational component of the camera lenses, etc. The calibration table 602 may include calibration parameters for any features of the probe 20 that may vary between units.

Using the calibration table 602 derived for the specific probe 20, the calibration table 602 may be employed with sensed measurements of the probe to arrive at accurate and repeatable measurements from the sensor to measure bores 604 in situ.

Embodiments described herein may be aligned with a bore and countersink through coordinate location as described above, and may employ visual locating. Embodiments of the probe 20 may use the forward-facing camera lens 54 to identify the location of the probe tip 24 relative to a bore or countersink. To accomplish this, off-axis illumination may be provided by a light source, such as light source 620 of FIG. 15. In an example, light source 620 is an off-axis illumination device. As shown, the light source 620 illuminates a surface of a workpiece, and reflected illumination is received through the in the forward-facing field of view 56 (as shown in FIG. 4) into the probe tip 24 and captured at the forward-facing camera lens 54. Based on the light reflected from the surface of the workpiece 630, a bore or countersink within the workpiece can be identified by a change in the reflected light. Using this technique, embodiments of the probe 20 can identify a bore and countersink location independently, and subsequently use the techniques described above for alignment with the bore based on dimensional measurement of the bore or countersink.

FIG. 16 is a flowchart of a method for optically measuring workpiece features, and more particularly, to optically measure internal surfaces of round bores and countersinks. According to the illustrated method 700, a probe 20 is advanced through a bore 80 and a countersink 82 as shown at block 710. A first laser cone 63 is directed to a first reflective surface 62 to form a bore laser cone 64 at block 720 and a second laser cone 67 is directed to a second reflective surface 66 to form a countersink laser cone 68 at block 730. A bore camera lens 70 receives the bore laser cone 64 as shown at block 740 that has been reflected by the first reflective surface 62, reflected by the bore 80, and reflected by a third reflective surface 61 to the bore camera lens 70. A countersink camera lens 72 receives the countersink laser cone 68 as shown at block 750 that has been reflected by the second reflective surface 66, reflected by the countersink 82, and reflected by a countersink beam reflector 74 to the countersink camera lens 72. The bore 80 surface is measured at block 760 based on the bore laser cone 64 received at the bore camera lens 70. The countersink 82 is measured at block 770 based on the countersink laser cone 68 received at the countersink camera lens 72.

In an example, method 700 further includes generating, from a laser source 60 including a laser diode 60a and a diffractive optical element 60b, the first laser cone 63 at a first opening angle 163, where the first laser cone is reflected at the first reflective surface 62 to form the bore laser cone, and generating, from the laser source 60 including the laser diode 60a and the diffractive optical element 60b, the second laser cone 67 at a second opening angle 167, where the second laser cone is reflected at the second reflected surface to form the countersink laser cone, and where the second opening angle 167 is different from the first opening angle 163.

In an example, method 700 further includes identifying the bore 80 in a workpiece 84 based on light reflected from the workpiece to a forward-facing camera lens 54 of the probe 20 through an opening 22 defined in the probe tip 24.

In an example, measuring dimensions of the bore 80 and the countersink 82 are performed based, at least in part, on a calibration table 602 established for the probe 20.

In an example, method 700 further includes measuring dimensions of an exit burr 300 on an exit surface 88 of the bore in response to the probe 20 advancing past the exit surface 88 of the bore 80.

As described above, FIG. 16 illustrates a flowchart of a system, method, and apparatus according to example embodiments of the present disclosure. It will be understood that each block of the flowcharts, and combinations of blocks in the flowcharts, may be implemented by various means, such as hardware, firmware, processor, circuitry, computing device, and/or other devices associated with execution of software including one or more computer program instructions. For example, one or more of the procedures described above may be embodied by computer program instructions. In this regard, the computer program instructions which embody the procedures described above may be stored by the memory 38 of a controller 30 employing an embodiment of the present disclosure and executed by the processing circuitry 36 of the controller 30. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments set forth herein will come to mind to one skilled in the art having the benefit of the teachings presented in the foregoing descriptions and the associated drawings. Therefore, it is to be understood that the present application is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A probe comprising:
a probe base and a probe tip;
a countersink camera having a countersink camera lens;
a bore camera having a bore camera lens; and
a laser source configured to generate a first laser cone and a second laser cone,
wherein the probe tip includes a first reflective surface and a second reflective surface, wherein the first reflective surface is configured to receive the first laser cone and form a bore laser cone, wherein the second reflective surface is configured to receive the second laser cone and form a countersink laser cone, wherein the bore camera lens receives the bore laser cone reflected from a bore in response to the probe tip being received within the bore, and wherein the countersink camera lens is configured to receive the countersink laser cone reflected from a countersink in response to the probe tip being received within the countersink.

2. The probe of claim 1, wherein the laser source comprises a laser diode and a diffractive optical element configured to receive a laser beam from the laser diode and generate the first laser cone and the second laser cone.

3. The probe of claim 1, further comprising:
a forward-facing camera having a forward-facing camera lens; and
a light source, wherein the forward-facing camera lens is configured to receive, through an opening defined in the probe tip, light from the light source reflected from a workpiece.

4. The probe of claim 1, wherein the first laser cone comprises a first opening angle, wherein the second laser cone comprises a second opening angle, different from the first opening angle.

5. The probe of claim 4, wherein the first reflective surface is positioned in the probe tip to receive the first laser cone at the first opening angle and wherein the second reflective surface is positioned in the probe tip to receive the second laser cone at the second opening angle.

6. The probe of claim 1, wherein the bore camera lens receives the bore laser cone reflected from the bore, to a third reflective surface and to the bore camera lens in response to the probe tip being received within the bore.

7. The probe of claim 1, wherein the countersink camera lens is configured to receive the countersink laser cone reflected from a countersink to a countersink beam reflector and to the countersink camera lens in response to the probe tip being received within the countersink.

8. The probe of claim 1, further comprising a controller, wherein the controller is configured to measure a surface of the bore in response to the bore laser cone received at the bore camera lens.

9. The probe of claim 8, wherein the controller is configured to determine one or more dimensions of the bore and an exit burr in response to the bore laser cone received at the bore camera lens.

10. The probe of claim 1, wherein the probe tip defines a first opening and a second opening, wherein the first reflective surface is disposed within the first opening, and the second reflective surface is disposed within the second opening.

11. A system comprising:
a controller; and
a probe comprising:
a probe base and a probe tip, the probe tip having a first reflective surface and a second reflective surface;
a countersink camera within the probe tip having a countersink camera lens;
a bore camera within the probe tip having a bore camera lens; and
a laser source within the probe tip configured to generate a first laser cone and a second laser cone, wherein the first reflective surface is configured to receive the first laser cone and form a bore laser cone, wherein the second reflective surface is configured to receive the second laser cone and form a countersink laser cone,
wherein dimensions of a bore are measured by the controller in response to the probe tip being received within the bore and the bore camera lens receiving the bore laser cone, wherein dimensions of a countersink are measured by the controller in response to the probe tip being received within the countersink and the countersink camera lens receiving the countersink laser cone.

12. The system of claim 11, wherein the first laser cone is received at the first reflective surface at a first opening angle, and wherein the second laser cone is received at the second reflective surface at a second opening angle, different from the first opening angle.

13. The system of claim 12, wherein the probe further comprises a third reflective surface, wherein the bore laser cone is received at the bore camera lens from the third reflective surface in response to the first laser cone being reflected from the first reflective surface to form the bore laser cone and the bore laser cone being reflected from the bore to the third reflective surface.

14. The system of claim 12, wherein the probe further comprises a countersink beam reflector, wherein the countersink laser cone is received at the countersink camera lens from the countersink beam reflector in response to the second laser cone being reflected from the second reflective surface to form the countersink laser cone and the countersink laser cone being reflected from the countersink to the countersink beam reflector.

15. The system of claim 11, wherein the controller is configured to:
determine one or more dimensions of the countersink in response to the probe advancing through the countersink based on the countersink laser cone received at the countersink camera lens; and
determine one or more dimensions of the bore and one or more exit burrs in response to the probe advancing through the bore based on the bore laser cone received at the bore camera lens.

16. A method for measuring dimensions of a bore and countersink comprising:
advancing a probe through a bore and a countersink; and
measuring dimensions of the bore and the countersink based on a bore laser cone received at a bore camera lens and a countersink laser cone received at a countersink camera lens, wherein the bore laser cone is received at the bore camera lens in response to a first laser cone reflecting from a first reflective surface of the probe to form the bore laser cone and the bore laser cone being reflected from a surface of the bore to a third reflective surface of the probe and to the bore camera lens, and wherein the countersink laser cone is received at the countersink camera lens in response to a second laser cone reflecting from a second reflective surface of the probe to form the countersink laser cone, the countersink laser cone being reflected from a surface of the countersink to a countersink beam reflector and to the countersink camera lens.

17. The method of claim 16, further comprising:
generating, from a laser source and a diffractive optical element, the first laser cone at a first opening angle, wherein the first laser cone is reflected at the first reflective surface to form the bore laser cone; and
generating, from the laser source and the diffractive optical element, the second laser cone at a second opening angle, wherein the second laser cone is reflected at the second reflective surface to form the countersink laser cone, and wherein the second opening angle is different from the first opening angle.

18. The method of claim 16, further comprising:
identifying the bore in a workpiece based on light reflected from the workpiece to a forward-facing camera lens of the probe through an opening defined in a probe tip of the probe.

19. The method of claim 16, wherein measuring dimensions of the bore and the countersink are performed based, at least in part, on a calibration table established for the probe.

20. The method of claim 16, further comprising:
measuring dimensions of a burr on an exit surface of the bore in response to the probe advancing past the exit surface of the bore.

\* \* \* \* \*